(12) United States Patent
Eberlein et al.

(10) Patent No.: US 11,011,974 B2
(45) Date of Patent: May 18, 2021

(54) INVERTER ARRANGEMENT, ELECTRIC DRIVE SYSTEM, AND METHOD FOR DISCHARGING A DC LINK CAPACITOR IN AN INVERTER ARRANGEMENT

(71) Applicant: Robert Bosch GmbH, Stuttgart (DE)

(72) Inventors: Edwin Eberlein, Stuttgart (DE); Martin Trunk, Neuenstadt (DE); Timo Bartsch, Heimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 11 days.

(21) Appl. No.: 16/097,310

(22) PCT Filed: Mar. 23, 2017

(86) PCT No.: PCT/EP2017/056960
§ 371 (c)(1),
(2) Date: Feb. 18, 2019

(87) PCT Pub. No.: WO2017/186419
PCT Pub. Date: Nov. 2, 2017

(65) Prior Publication Data
US 2019/0199200 A1 Jun. 27, 2019

(30) Foreign Application Priority Data
Apr. 29, 2016 (DE) .................... 10 2016 207 373.7

(51) Int. Cl.
*H02M 7/5387* (2007.01)
*H02M 1/32* (2007.01)
(Continued)

(52) U.S. Cl.
CPC ......... *H02M 1/32* (2013.01); *H02M 7/53871* (2013.01); *H02M 7/53875* (2013.01);
(Continued)

(58) Field of Classification Search
CPC ............. H02M 1/32; H02M 2001/322; H02M 7/53871; H02M 7/53875; H02P 27/06; B60L 3/04
(Continued)

(56) References Cited

U.S. PATENT DOCUMENTS

2005/0231171 A1* 10/2005 Kato ................... H02M 5/4585
320/166
2011/0080149 A1 4/2011 Fukuta et al.
(Continued)

FOREIGN PATENT DOCUMENTS

CN 102428635 A 4/2012
CN 103269155 A 8/2013
(Continued)

*Primary Examiner* — Eduardo Colon Santana
*Assistant Examiner* — Zemenay T Truneh
(74) *Attorney, Agent, or Firm* — Michael Best & Friedrich LLP

(57) ABSTRACT

The invention relates to the discharging of a DC link capacitor in an inverter arrangement, thereby allowing, for example, a DC link capacitor to be discharged while an electric machine that is connected to the inverters can operate in an idling mode as a safe mode. The DC link capacitor is discharged by very briefly triggering a semiconductor switch within the inverter. According to the invention, the inverter bridge arm with the smallest phase voltage is selected for the very brief triggering process.

13 Claims, 3 Drawing Sheets

(51) Int. Cl.
  *H02P 27/06* (2006.01)
  *B60L 3/04* (2006.01)
(52) U.S. Cl.
  CPC ............... *H02P 27/06* (2013.01); *B60L 3/04* (2013.01); *H02M 2001/322* (2013.01)
(58) Field of Classification Search
  USPC .......................................... 318/504, 400.27
  See application file for complete search history.

(56) References Cited

U.S. PATENT DOCUMENTS

| | | |
|---|---|---|
| 2011/0221374 A1 | 9/2011 | Maebara et al. |
| 2012/0049773 A1 | 3/2012 | Muraho et al. |
| 2014/0095005 A1 | 4/2014 | Kanzaki et al. |
| 2014/0333246 A1* | 11/2014 | Eberlein ................... B60L 3/04 318/400.27 |

FOREIGN PATENT DOCUMENTS

| | | |
|---|---|---|
| CN | 103843216 A | 6/2014 |
| JP | 2007195343 A | 8/2007 |

* cited by examiner

INVERTER ARRANGEMENT, ELECTRIC DRIVE SYSTEM, AND METHOD FOR DISCHARGING A DC LINK CAPACITOR IN AN INVERTER ARRANGEMENT

BACKGROUND OF THE INVENTION

The present invention relates to an inverter arrangement and an electric drive system comprising such an inverter arrangement, and a method for discharging an intermediate-circuit capacitor in an inverter arrangement. In particular, the present invention relates to the discharging of an intermediate-circuit capacitor in an inverter arrangement in a freewheeling mode.

Electric drive systems as used, for example, in electric and hybrid vehicles, may comprise inverters which generate voltage signals from a DC voltage, said signals being suitable for activating an electric machine. Here, a DC voltage intermediate circuit comprising an intermediate-circuit capacitor is provided at the input of such an inverter.

The inverters may, for example, be designed as a full bridge circuit comprising a predetermined number of bridge arms comprising two semiconductor switches in each case. Here, a first semiconductor switch may be connected to a first terminal of the DC voltage intermediate circuit as a so-called high-side switch. A second semiconductor switch may be connected to a second terminal of the DC voltage intermediate circuit as a so-called low-side switch. Furthermore, the first and the second semiconductor switches are electrically interconnected at a node. Each of these nodes may be connected to a phase terminal of an electric machine. For example, bipolar transistors having an insulated gate electrode (IGBT module) with diodes or MOSFETs (metal-oxide field-effect transistors) connected anti-parallel may be used as semiconductor switches.

In the event of a fault, various requirements are placed on the control for reasons of safety. For example, in the event of a fault, it may be necessary to put a connected electric machine into a safe operating mode. Such a safe operating mode may, for example, comprise an active short circuit in which all high-side switches or all low-side switches are closed. Alternatively, a freewheeling mode may also be provided as a safe operating mode, in which all switches of the full bridge are open.

In addition, in the event of a fault, it may also be desirable to discharge the DC voltage intermediate circuit rapidly and reliably. This can, for example, be achieved via emergency discharging.

The publication WO 2013/050196 A1 discloses an opening device and a method for discharging a capacitor in an inverter. Here, the discharging of the capacitor in the inverter is carried out during an active short circuit by activating the semiconductor switching elements of the inverter.

SUMMARY OF THE INVENTION

The present invention discloses an inverter, an electric drive system, and a method for discharging an intermediate-circuit capacitor in an inverter arrangement.

Accordingly, the following is provided:

An inverter arrangement comprising a full bridge circuit and a control device. The full bridge circuit comprises a plurality of bridge arms. Each bridge arm of the full bridge circuit comprises a first semiconductor switch and a second semiconductor switch. Here, the first semiconductor switch and the second semiconductor switch of a bridge arm are respectively interconnected at a node of the respective bridge arm. The control device is designed to ascertain a primary bridge arm having the lowest phase voltage between the respective node of the bridge arm and a reference potential. The control device is furthermore designed to close the first semiconductor switch of the primary bridge arm and to pulse the second semiconductor switch of the primary bridge arm. Furthermore, the control device may be designed to open the semiconductor switches of the full bridge which are not in the primary bridge arm.

Furthermore, the following is provided:

An electric drive system comprising an inverter arrangement according to the present invention, an intermediate-circuit capacitor, and an electric machine. The intermediate-circuit capacitor is electrically connected to an input terminal of the inverter arrangement. The electric machine comprises a plurality of phase terminals. Each phase terminal of the electric machine is electrically connected to a node of a bridge arm of the full bridge.

Furthermore, the following is provided:

A method for discharging an intermediate-circuit capacitor in an inverter arrangement comprising a full bridge circuit which comprises a plurality of bridge arms, wherein each bridge arm comprises a first semiconductor switch and a second semiconductor switch which are respectively interconnected at a node. The method comprises the steps of ascertaining a primary bridge arm having the lowest phase voltage between the respective node of the bridge arm and a reference potential; closing the first semiconductor switch of the primary bridge arm; pulsing the second semiconductor switch of the primary bridge arm; and opening the semiconductor switches of the full bridge which are not in the primary bridge arm.

The present invention is based on the finding that discharging the intermediate-circuit capacitor in an inverter is desirable in all safe operating states of an electric machine. In particular, the present invention is based on the finding that an intermediate-circuit capacitor in an inverter is also required in a freewheeling mode acting as a safe state.

One idea of the present invention is therefore to take this finding into account and to enable discharging of an intermediate-circuit capacitor which is as efficient as possible, even in a freewheeling mode. As a result, required safety criteria may also be maintained in the freewheeling mode acting as a safe operating state. The freewheeling mode may thus be maintained as a safe operating state as necessary, and a change in an active short circuit does not have to be carried out. By discharging the intermediate-circuit capacitor in the freewheeling mode, an active short circuit is thus not necessarily required. Thus, for example, the heating of the inverter and the connected electric machine due to an active short circuit may also be reduced.

In addition, for example, when using asynchronous machines, an active short circuit is possibly not permissible, since very high stator currents may develop in this case, and in addition, a high braking torque develops.

Therefore, the present invention also enables efficient discharging of an intermediate-circuit capacitor in the entire rotational speed range of an at least partially de-electrified or demagnetized asynchronous machine.

According to one embodiment, the pulsing of the second semiconductor switch in the primary bridge arm comprises a brief activation of the second semiconductor switch. However, the second semiconductor switch is not completely switched to the conductive state. The activation signals for activating the second semiconductor switch are selected to be short enough that the semiconductor switch is only briefly in a transient state between the blocking state and the conductive state. During this period, energy can flow out of the intermediate-circuit capacitor via the semiconductor switch, and can thus be converted into heat. This enables a rapid and efficient dissipation of the voltage in the intermediate-circuit capacitor.

According to one embodiment, the control device of the inverter arrangement is designed to open a semiconductor switch of the full bridge which is not in the primary bridge arm, if an electric current flowing through the corresponding semiconductor switch exceeds a predetermined limit value. On the other hand, if the electric current in the semiconductor switch is below the predetermined limit value, the torque of the electric machine thus generated remains negligible, and opening the corresponding semiconductor switch is not necessary.

According to one embodiment, each bridge arm of the full bridge comprises a voltage sensor. This voltage sensor is designed to detect a voltage between the corresponding node of the respective bridge arm and a reference potential. By evaluating the detected voltage between the node and the reference potential, the association of a bridge arm with a primary bridge arm may be carried out in a simple manner in each case.

According to one embodiment, the primary bridge arm is ascertained based on a rotor position of an electric machine which is electrically connectable to the inverter arrangement. By evaluating the rotor position of an electric machine, a simple association of a bridge arm with the primary bridge arm may be made without an additional sensor system, for example, a voltage measurement.

According to one embodiment of the electric drive system, the electric machine comprises a permanently excited synchronous machine. Discharging the intermediate-circuit capacitor by means of the inverter arrangement is thus possible in a freewheeling mode, even in the case of permanently excited synchronous machines below a predetermined synchronous generated voltage.

According to one embodiment, the control device of the inverter arrangement is designed to trigger an active short circuit in the full bridge if the synchronous generated voltage in the electric machine, in particular a permanently excited synchronous machine, exceeds a predetermined limit value. For example, the limit value may be set to a value of the quotient of $$\frac{\text{Intermediate-circuit voltage}}{2 \cdot \cos 30°}.$$

According to an additional embodiment, the electric machine may comprise an asynchronous machine. In particular in the case of asynchronous machines, an active short circuit is not permissible as a safe operating state, since very high stator currents thus develop and a very high braking torque forms. However, it is possible that even in the case of asynchronous machines, a change in an active short circuit may occur after a corresponding reduction of the flux, or rather the field-forming stator current.

The above embodiments and refinements may be combined in any manner, to the extent that this is reasonable. Additional embodiments, refinements, and implementations of the present invention also comprise combinations of features of the present invention not explicitly mentioned, which have been previously described or which are described below with respect to the exemplary embodiments. In particular, those skilled in the art will also add individual elements to the respective basic forms of the present invention as improvements or refinements.

BRIEF DESCRIPTION OF THE DRAWINGS

The present invention will be described in greater detail below, based on the examples specified in the schematic figures of the drawing. The following are shown.

DETAILED DESCRIPTION

Figure 1:
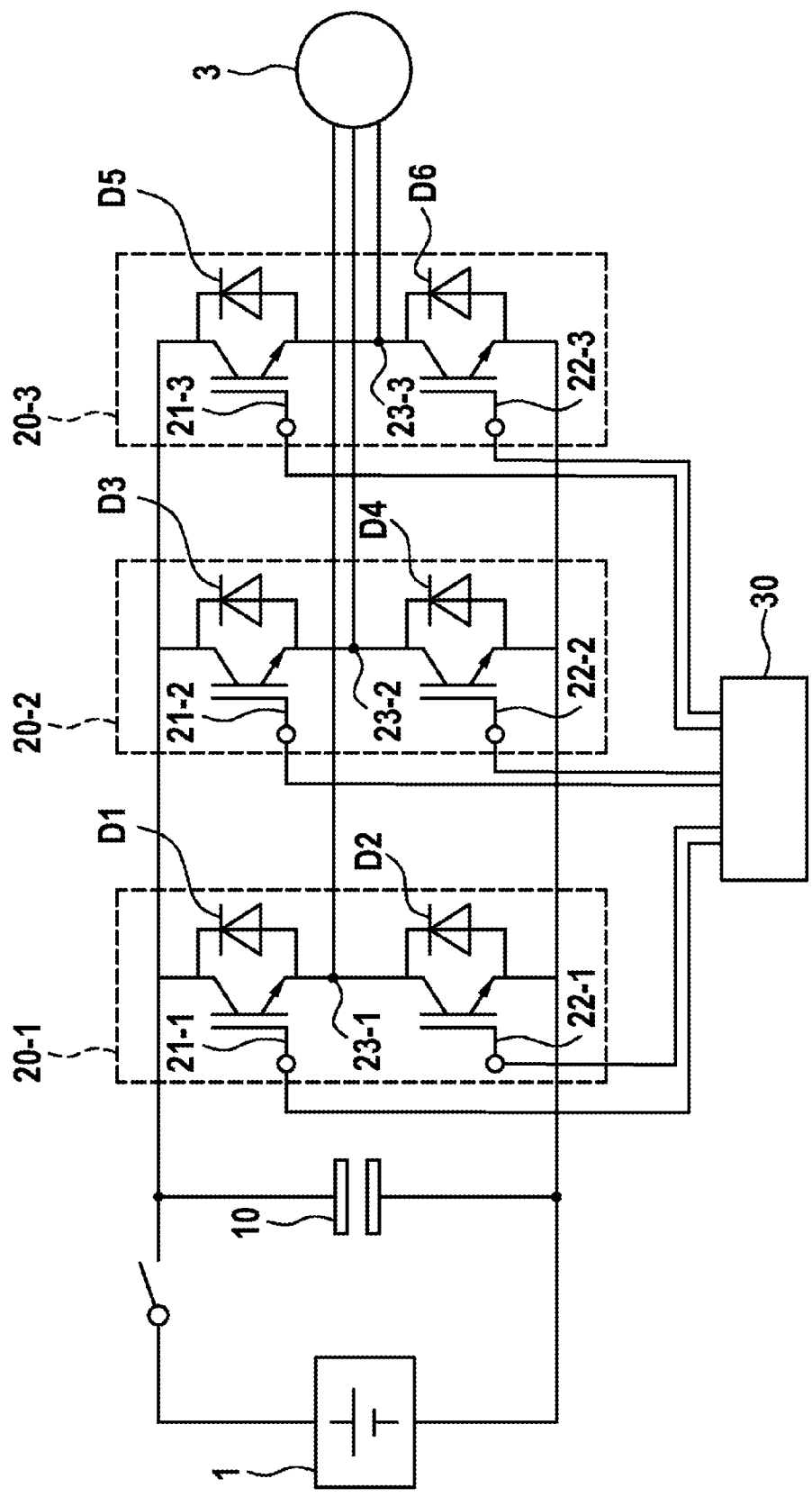
FIG. 1: a schematic representation of an electric drive system comprising an inverter arrangement, according to one embodiment.

In all figures, identical or functionally identical elements and devices have been provided with identical reference characters, unless specified otherwise.

FIG. 1 shows a schematic representation of an electric drive system comprising an inverter arrangement 2, according to one embodiment. The inverter arrangement 2 comprises a full bridge circuit having a plurality of bridge arms 20-$i$. The number depicted here of three bridge arms merely constitutes an exemplary embodiment. However, the inverter arrangement is not limited to a full bridge circuit having exactly three bridge arms. Rather, full bridge circuits having two, four, five, six, or any arbitrary number of bridge arms are also conceivable. Each bridge arm 20-$i$ comprises a first semiconductor switch 21-$i$ and a second semiconductor switch 22-$i$. The first semiconductor switch 21-$i$ and the second semiconductor switch 22-$i$ are respectively interconnected at a node 23-$i$. In the embodiment depicted here, the first semiconductor switch 21-$i$ is the upper semiconductor switch (high-side switch), and the second semiconductor switch 22-$i$ is the lower semiconductor switch (low-side switch). Alternatively, it is also equally possible that the upper semiconductor switch is depicted as the second semiconductor switch and the lower semiconductor switch is depicted as the first semiconductor switch. A diode Di may be provided in each case, in parallel with each semiconductor switch 21-$i$ and 22-$i$. The semiconductor switches may, for example, be bipolar transistors having an insulated gate terminal (IGBTs). However, in addition, metal-oxide field-effect transistors (MOSFETs) or other semiconductor switches are also equally possible.

At a connecting point, all bridge arms 20-$i$ are electrically connected to a terminal of the intermediate-circuit capacitor 10. The other terminals of the bridge arms 20-$i$ are connected to another terminal of the intermediate-circuit capacitor 10. The nodes 23-$i$ of the bridge arms 20-$i$ may be electrically connected to the phase terminals of an electric machine 3. The intermediate-circuit capacitor 10 and thus the inverter arrangement 2 may be supplied by a DC voltage source 1, for example, a traction battery of an electric or hybrid vehicle or the like. A circuit breaker may be provided between the DC voltage source 1 and the intermediate-circuit capacitor 10, for interrupting the electrical connection between the DC voltage source 1 and the intermediate-circuit capacitor 10. The semiconductor switches 21-*i* and 22-*i* of the full bridge are activated by a control device 30.

In a normal operating mode, the control device 30 may activate the semiconductor switches 21-*i* and 22-*i* in order to set a desired torque at the electric machine 3. In addition, the electric machine 3 may be put into a safe operating state, for example, in a hazardous situation or the like. In this case, the intermediate-circuit capacitor 10 may also be discharged.

For example, an active short circuit may be selected as a safe operating state. In the case of the active short circuit, all upper semiconductor switches, for example, the first semiconductor switches 21-*i*, or alternatively, all lower semiconductor switches, for example, all second semiconductor switches 22-*i*, are closed. Alternatively, however, a freewheeling mode may also be selected as a safe operating state, in which no electrical connection exists between the individual phase terminals of the electric machine 3. For example, for this purpose, all semiconductor switches 21-*i* and 22-*i* of the full bridge may be open. In addition, to discharge the intermediate-circuit capacitor 10, a semiconductor switch may be closed in a bridge arm 20-*i* of the full bridge, while pulsing takes place via the other semiconductor switch of the same bridge arm 20-*i*. The term pulsing is to be understood to mean that a semiconductor switch is briefly activated via an activation signal of the control device 30, wherein the pulse length of the activation signal is chosen to be short enough that the corresponding semiconductor switch 21-*i* or 22-*i* is not completely switched to the conductive state. Rather, the semiconductor switch 21-*i* or 22-*i* passes only briefly into a transient state between a blocking state and a conductive state. During this period, energy from the intermediate-circuit capacitor 10 may be converted into heat in the respective semiconductor switch 21-*i* or 22-*i*, whereby the energy of the intermediate-circuit capacitor 10 is rapidly and effectively dissipated.

Figure 2:
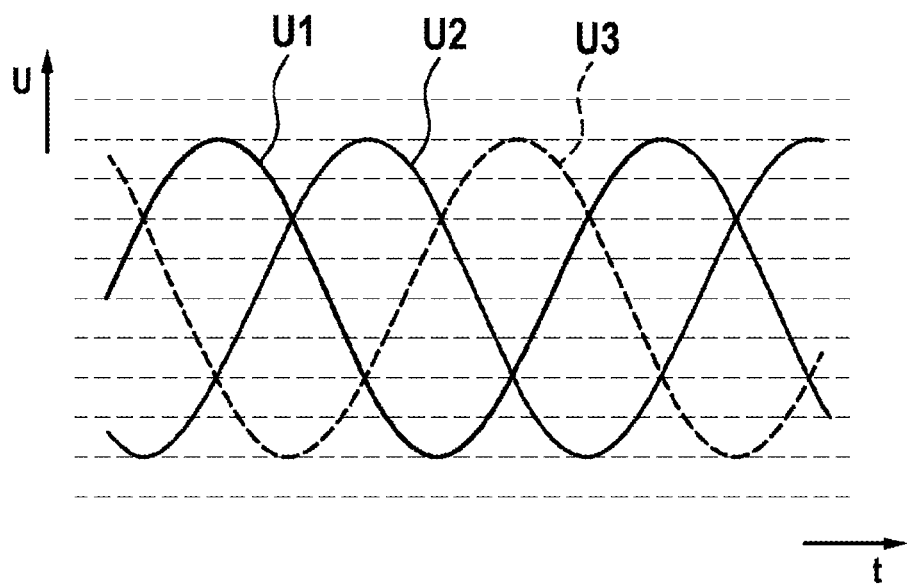
FIG. 2: a schematic representation of voltage profiles of the phase voltages of an electric drive system.

If all semiconductor switches 21-*i* and 22-*i* of the full bridge are open in the inverter 2, a voltage system U1, U2, U3 develops in the phase branches of the electric machine 3, said voltage system being able to move freely between the positive and negative potentials of the connected DC voltage source 1, as depicted schematically by way of example in FIG. 2.

Figure 3:
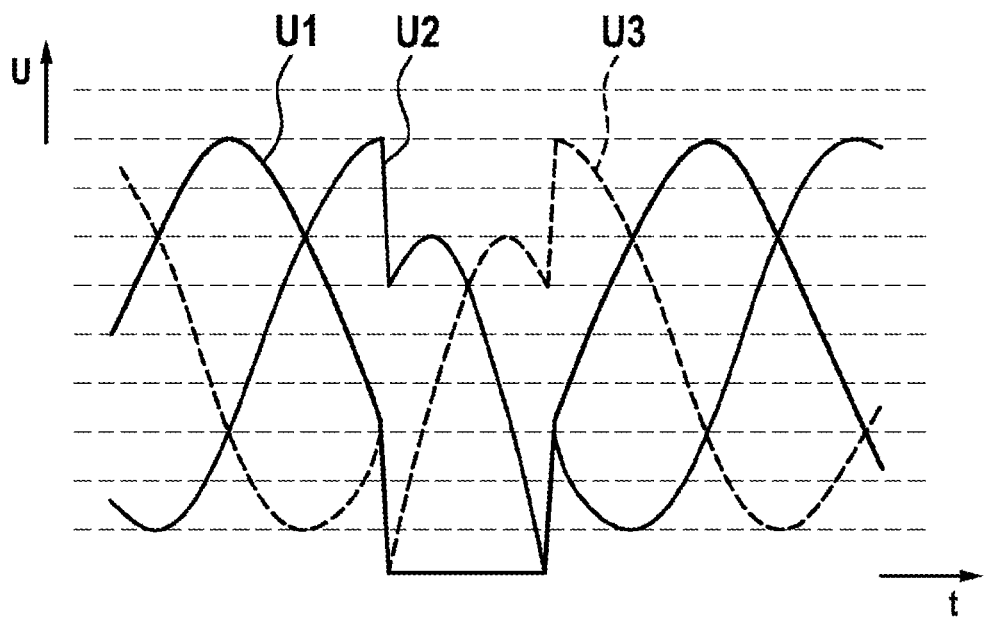
FIG. 3: a schematic representation of a voltage profile in an electric drive system, according to one embodiment.

FIG. 3 shows a schematic representation of a voltage profile of a three-phase system, wherein pulsing takes place via the first bridge arm 20-1 during the period I. In this case, at the start of the time interval I, it is determined via the control device 30 that the phase voltage U1 at the node 23-1 is lower than the phase voltages U2 and U3 at the nodes 23-2 and 23-3. Thus, the first bridge arm 20-1 is selected for the pulsing by the control device 30. For this purpose, the control device 30 closes the lower semiconductor switch 22-1. As a result, the three-phase system now no longer floated between the potentials of the intermediate circuit voltage, but is fixedly referenced to the negative potential of the intermediate circuit via the conductive switch 22-1. The voltage between the individual conductors of the electric machine 3 is still just as high as in the freewheeling mode. No current is applied to the electric machine 3. Subsequently, pulsing takes place via the upper semiconductor switch 21-1 of the first bridge arm 20-1. As a result, electrical energy from the intermediate-circuit capacitor 10 can be converted into heat in the semiconductor switch 21-1.

At the end of the time interval I, the phase voltage U2 at the node 23-2 of the second bridge arm 20-2 drops below the phase voltages U1, U3 at the first node 23-1 of the first bridge arm 20-1. Therefore, the pulsing in the first bridge arm 20-1 is terminated, and the closed semiconductor switch 22-1 in the first bridge arm 20-1 is opened.

Subsequently, the discharging of the intermediate-circuit capacitor 10 may be continued via pulsing in the second bridge arm 20-2, since the voltage at the second node 23-2 of the second bridge arm 20-2 is now lower than the phase voltages at the nodes 23-1 and 23-3 of the first or third bridge arm 20-1 or 20-3.

Figure 4:
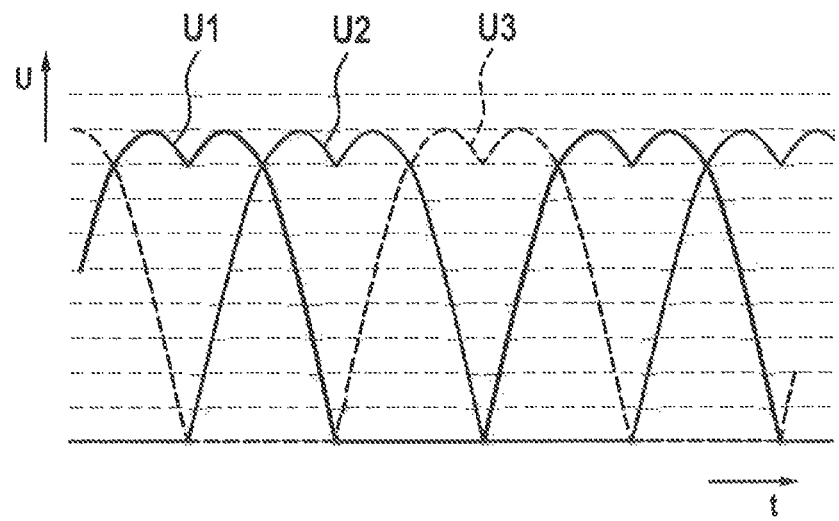
FIG. 4: a schematic representation of a voltage profile for the phase voltage of an electric drive system, according to one embodiment.

If the previously described approach is combined for all three phases, a signal profile of the phase voltages is obtained, as depicted in FIG. 4. As is apparent, in a three-phase system, respectively after 120°, a change is carried out of the bridge arm 20-*i* in which the pulsing occurs via a semiconductor switch of the corresponding bridge arm 20-*i*.

The selection of the corresponding bridge arm 20-*i* for the pulsing may, for example, take place by measuring the phase voltages U1, U2, U3 at the nodes 23-*i*. For example, a suitable voltage sensor may be used for this purpose.

In addition or alternatively, it is also possible to ascertain the bridge arm 20-*i* for the pulsing, respectively based on a position of the rotor in the electric machine 3. For this purpose, the rotor position of the electric machine 3 may be ascertained by means of any method for determining the rotor position.

In the above-described exemplary embodiment, the respective lower semiconductor switch 22-*i* has been closed, and the pulsing takes place via the corresponding upper semiconductor switch 21-*i* of the respective bridge arm 20-*i*. In addition, it is also possible that the respective upper semiconductor switch 21-*i* is closed, and the pulsing takes place via the corresponding lower semiconductor switch 22-*i* of the respective bridge arm 20-*i*. It is also equally possible to carry out respectively alternating pulsing via the upper and the lower semiconductor switch 21-*i* and 22-*i*. In this way, the heat generated when discharging the intermediate-circuit capacitor 10 can be equally distributed across the two semiconductor switches 21-*i* and 22-*i* of a bridge arm 20-*i*. The respective pulsing may possibly also take place by means of a temperature sensor, via the semiconductor switch 21-*i* or 22-*i* which has the lower temperature.

In addition, any arbitrary additional criteria are possible in order to determine the semiconductor switch 21-*i* or 22-*i* for the pulsing.

The electric machine 3 may, for example, be a permanently excited synchronous machine or an asynchronous machine. In this case, in particular in the case of permanently excited synchronous machines, the freewheeling mode may also be chosen as a safe state as long as the amplitude of the synchronous generated voltage, i.e., the voltage between the conductor and the star of the electric machine, is less than the quotient of $$\frac{\text{Intermediate-circuit voltage}}{2 \cdot \cos 30°}.$$

If the amplitude of the synchronous generated voltage exceeds this voltage value or an alternative predetermined voltage value, the inverter arrangement 2 may also be switched to the active short circuit. In this case, either all upper semiconductor switches 21-*i* or all lower semiconductor switches 22-*i* are closed.

Figure 5:
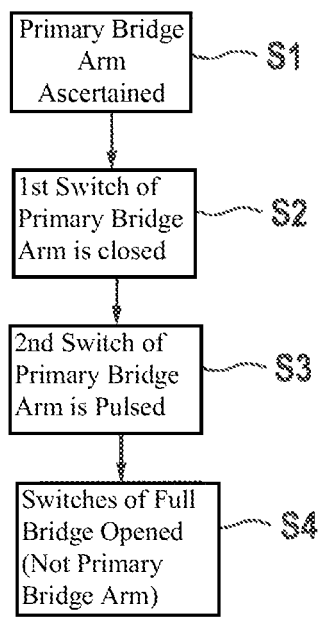
FIG. 5: a schematic representation of a flow chart as based on a method for discharging an intermediate-circuit capacitor, according to one embodiment.

FIG. 5 shows a schematic representation of a flow chart as based on a method for discharging an intermediate-circuit capacitor 10 in an inverter arrangement 2. The inverter arrangement 2 may, for example, be a previously described inverter arrangement 2 comprising a full bridge circuit having a plurality of bridge arms 20-*i*. In a first step S1, initially, a primary bridge arm is ascertained. The primary bridge arm comprises the bridge arm having the lowest phase voltage between the node 23-*i* and a reference potential. Subsequently, in step S2, the first semiconductor switch of the primary bridge arm is closed, and in step S3, the second semiconductor switch of the primary bridge arm is pulsed. As previously described, in this case, the first semiconductor switch may comprise the upper or the lower semiconductor switch 21-*i* or 22-*i* of a bridge arm 20-*i*. The pulsing takes place respectively via the other semiconductor switch of this bridge arm 20-*i*. In step S4, in addition, the semiconductor switches 21-*i* and 22-*i* of the full bridge, which are not in the primary bridge arm, are opened. In this way, an electric machine 3 connected to the inverter 2 may be operated in the freewheeling mode acting as a safe state, while an intermediate-circuit capacitor 10 of the inverter arrangement 2 may be discharged via the pulsing of the semiconductor switches.

In summary, the present invention relates to the discharging of an intermediate-circuit capacitor in an inverter arrangement, while an electric machine connected to the inverter in a freewheeling mode may be operated as a safe state. The discharging of the intermediate-circuit capacitor takes place by pulsing a semiconductor switch within the inverter. In this case, the respective bridge arm of the inverter of which the phase voltage is the lowest is selected for the pulsing.

The invention claimed is:

1. An inverter arrangement (2), comprising:
 a full bridge circuit having a plurality of bridge arms (20-*i*), wherein each bridge arm (20-*i*) comprises a first semiconductor switch (21-*i*) and a second semiconductor switch (22-*i*) which are respectively interconnected at a node (23-*i*);
 a control device (30) which is configured
  to ascertain a primary bridge arm having the lowest phase voltage between the respective node (23-*i*) of the bridge arm (20-*i*) and a reference potential,
  to close the first semiconductor switch (21-*i*) of the primary bridge arm having the lowest phase voltage between the respective node of the bridge arm and a reference potential,
  to pulse the second semiconductor switch (22-*i*) of the primary bridge arm, and
  to open the semiconductor switches (21-*i*, 22-*i*) of the full bridge which are not in the primary bridge arm.

2. The inverter arrangement (2) as claimed in claim 1, wherein the pulsing of the second semiconductor switch (22-*i*) in the primary bridge arm comprises a brief activation of the second semiconductor switch (22-*i*), and the second semiconductor switch (22-*i*) is not completely switched to the conductive state.

3. The inverter arrangement (2) as claimed in claim 1, wherein the control device (30) is configured to open a semiconductor switch (21-*i*, 22-*i*) of the full bridge which is not in the primary bridge arm, if an electric current flowing through the corresponding semiconductor switch (21-*i*, 22-*i*) exceeds a predetermined limit value.

4. The inverter arrangement (1) as claimed in claim 1, wherein each bridge arm (20-*i*) of the full bridge comprises a voltage sensor which detects a voltage between the node (23-*i*) of the respective bridge arm (20-*i*) and the reference potential.

5. The inverter arrangement (2) as claimed in claim 1, wherein the primary bridge arm is ascertained based on a rotor position of an electric machine (3) which is electrically connectable to the inverter arrangement (2).

6. An electric drive system, comprising:
 an inverter arrangement (2) as claimed in claim 1;
 an intermediate-circuit capacitor (10) which is electrically connected to an input terminal of the inverter arrangement (2); and
 an electric machine (3) having a plurality of phase terminals, wherein each phase terminal of the electric machine (3) is respectively electrically connected to a node (23-*i*) of a bridge arm (20-*i*) of the full bridge.

7. The electric drive system as claimed in claim 6, wherein the electric drive machine (3) comprises a permanently excited synchronous machine.

8. The electric drive system as claimed in claim 6, wherein the control device (30) is designed to trigger an active short circuit in the full bridge if a synchronous generated voltage in the electric machine (3) exceeds a predetermined limit value.

9. The electric machine as claimed in claim 6, wherein the electric machine (3) comprises an asynchronous machine.

10. The inverter arrangement (2) as claimed in claim 1, including an intermediate-circuit capacitor (10) which is electrically connected to an input terminal of the inverter arrangement (2).

11. The inverter arrangement (2) as claimed in claim 10, including diodes Di provided in parallel with each of the semiconductor switches (21-I, 22-*i*).

12. The inverter arrangement (2) as claimed in claim 10, wherein the intermediate-circuit capacitor (10) is electrically discharged in a freewheeling mode to reduce heating of the inverter arrangement (2) and a connected electric machine.

13. A method for discharging an intermediate-circuit capacitor (10) in an inverter arrangement (2) comprising a full bridge circuit which comprises a plurality of bridge arms (20-*i*), and each bridge arm (20-*i*) comprises a first semiconductor switch (21-*i*) and a second semiconductor switch (22-*i*) which are respectively interconnected at a node (23-*i*), including the steps of:
 ascertaining (S1) a primary bridge arm having a lowest phase voltage between the respective node (23-*i*) of the bridge arm (20-*i*) and a reference potential;
 closing (S2) the first semiconductor switch (21-*i*) of the primary bridge arm;
 pulsing (S3) the second semiconductor switch (22-*i*) of the primary bridge arm; and
 opening (S4) the semiconductor switches (21-*i*, 22-*i*) of the full bridge which are not in the primary bridge arm.

* * * * *